United States Patent
Hofmann

(10) Patent No.: US 12,132,715 B2
(45) Date of Patent: Oct. 29, 2024

(54) SYSTEM AND METHOD FOR MANAGING AN AUTHORIZATION FOR A VEHICLE

(71) Applicant: Bayerische Motoren Werke Aktiengesellschaft, Munich (DE)

(72) Inventor: Sven Hofmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 272 days.

(21) Appl. No.: 17/423,805

(22) PCT Filed: Dec. 10, 2019

(86) PCT No.: PCT/DE2019/101069
§ 371 (c)(1),
(2) Date: Jul. 16, 2021

(87) PCT Pub. No.: WO2020/147875
PCT Pub. Date: Jul. 23, 2020

(65) Prior Publication Data
US 2022/0094676 A1    Mar. 24, 2022

(30) Foreign Application Priority Data
Jan. 17, 2019    (DE) ..................... 10 2019 101 120.5

(51) Int. Cl.
*H04L 9/08*    (2006.01)
*H04L 9/40*    (2022.01)

(52) U.S. Cl.
CPC .................................. *H04L 63/062* (2013.01)

(58) Field of Classification Search
CPC .................................................... H04L 63/062
See application file for complete search history.

(56) References Cited

U.S. PATENT DOCUMENTS 6,538,557 B1    3/2003    Giessl
6,940,391 B1    9/2005    Ishikura et al.
(Continued)

FOREIGN PATENT DOCUMENTS

CN    102118246 A    7/2011
CN    103553617 A    2/2014
(Continued)

OTHER PUBLICATIONS

International Search Report corresponding to International Patent Application No. PCT/DE2019/101069, dated Jan. 24, 2020 (4 pages).
(Continued)

*Primary Examiner* — Phy Anh T Vu
(74) *Attorney, Agent, or Firm* — Maginot, Moore & Beck LLP

(57) ABSTRACT

A system for managing an authorization for a vehicle includes a vehicle-based memory module, and a communication module. The memory module includes a key list containing a multiplicity of entries for a multiplicity of digital keys, which can be allocated to individual users via a first electronic apparatus. Each digital key represents a vehicle authorization for a user, and each entry in the key list is assigned a unique identifier. The communication module is configured to transfer from the vehicle to the first electronic apparatus at least one identifier assigned to an unallocated entry in the key list.

20 Claims, 2 Drawing Sheets

| 1 | digital key (allocated) | identifier 1 |
|---|---|---|
| 2 | empty | identifier 2 |
| ... | ... | ... |
| n | digital key (allocated) | identifier n |

(56) References Cited

U.S. PATENT DOCUMENTS

| | | | |
|---|---|---|---|
| 8,776,189 B2* | 7/2014 | Jain | G06Q 20/3574 |
| | | | 726/5 |
| 9,405,920 B1* | 8/2016 | Roth | G06F 21/645 |
| 9,688,247 B1* | 6/2017 | Jayaraman | H04L 9/32 |
| 10,589,719 B1* | 3/2020 | Sohn | G07C 9/21 |
| 2007/0294362 A1* | 12/2007 | Patel | H04N 21/25833 |
| | | | 348/E7.063 |
| 2010/0040234 A1 | 2/2010 | Alrabady et al. | |
| 2013/0099892 A1* | 4/2013 | Tucker | H04L 9/08 |
| | | | 340/5.61 |
| 2013/0173112 A1 | 7/2013 | Takahashi et al. | |
| 2013/0303085 A1* | 11/2013 | Boucher | H04W 12/069 |
| | | | 455/41.1 |
| 2014/0277837 A1* | 9/2014 | Hatton | H04L 63/0853 |
| | | | 701/2 |
| 2016/0368454 A1* | 12/2016 | Rork | G07C 9/215 |
| 2017/0251094 A1* | 8/2017 | Thooris | H04M 1/72406 |
| 2017/0330402 A1* | 11/2017 | Menard | G07C 9/00857 |
| 2017/0369071 A1* | 12/2017 | Gould | B60R 25/24 |
| 2022/0109662 A1* | 4/2022 | Jenkins | H04W 12/35 |
| 2022/0126786 A1* | 4/2022 | Hassani | B60R 25/102 |

FOREIGN PATENT DOCUMENTS

| | | |
|---|---|---|
| DE | 60206170 T2 | 6/2006 |
| DE | 60129967 T2 | 4/2008 |
| DE | 102010012565 A1 | 9/2011 |
| DE | 102010029929 A1 | 12/2011 |
| DE | 102010037271 A1 | 2/2012 |
| DE | 102011051498 A1 | 12/2012 |
| DE | 102012224421 A1 | 7/2013 |
| DE | 102013225742 A1 | 6/2014 |
| DE | 102016215021 A1 | 2/2018 |

OTHER PUBLICATIONS

German Search Report corresponding to German Patent Application No. 10 2019 101 120.5, dated Nov. 22, 2019 (10 pages).

Chinese Search Report corresponding to Chinese Patent Application No. 201980088338.8, dated Sep. 28, 2022 (7 pages).

* cited by examiner

| 1 | digital key (allocated) | identifier 1 |
|---|---|---|
| 2 | empty | identifier 2 |
| ... | ... | ... |
| n | digital key (allocated) | identifier n |

Fig. 3A

| 1 | empty | identifier n+1 |
|---|---|---|
| 2 | empty | identifier 2 |
| ... | ... | ... |
| n | digital key (allocated) | identifier n |

Fig. 3B

SYSTEM AND METHOD FOR MANAGING AN AUTHORIZATION FOR A VEHICLE

The present application is the U.S. national phase of PCT Application PCT/DE2019/101069 filed on Dec. 10, 2019, which claims priority of German patent application No. 102019101120.5 filed on Jan. 17, 2019, which is incorporated herein by reference in its entirety.

BACKGROUND

The present disclosure relates to a system and a method for managing an authorization for a vehicle, in particular a motor vehicle. The present disclosure in particular relates to issuing access and/or engine-start authorizations securely to a multiplicity of users.

Mobile identification providers can be used for contactless unlocking of vehicles and thereby providing the user of the identification provider with access to the vehicle. In general, systems are used in which authentication data is transferred wirelessly. In the event of a positive authentication by the vehicle, the doors and/or the trunk are unlocked automatically. In addition, it is possible to authorize or allow an engine start.

Mobile devices such as smartphones can be used as mobile identification providers. For example, the vehicle owner can, on his mobile device (also referred to as the "owner device"), pass digital keys to the mobile devices of other users (also referred to as the "friend device"). Information about a newly issued key and revoked keys reaches the vehicle by means of synchronization between the owner device of the vehicle owner and the vehicle. It can happen in this case, however, that the mobile devices have a different status of authorizations than the vehicle.

In particular, the friend device may receive a digital key from the vehicle owner, and the vehicle is informed thereof by a data packet. In addition, the vehicle owner may revoke the authorization from a friend device, and the vehicle is informed accordingly, whereupon the authorization is deleted in the vehicle. In the event that there is no synchronization, it can now happen by accident or by a targeted attack that said data packet is used to obtain unwanted access authorization at the vehicle once again for the friend device.

Revocation lists can be used to avoid these problems. In this case, the vehicle would have to keep the history of all deleted keys. If a new key is meant to be registered, a comparison with this list would have to take place. This is to verify that the supposedly new key has not been previously revoked. The revocation list cannot be implemented robustly, however, because of limited (secure) memory space in the vehicle control unit.

SUMMARY

An object of the present disclosure is to provide a system and a method for managing an authorization for a vehicle, in particular a motor vehicle, which authorization allows access authorizations to be allocated to a multiplicity of users. In particular, it is an object of the present disclosure to allow secure and resource-efficient management of access and/or engine-start authorizations to a vehicle.

This object is achieved by the subject matter of the independent claims. Advantageous embodiments are defined in the dependent claims.

According to an independent aspect of the present disclosure, a system is defined for managing an authorization for a vehicle. The authorization can relate to access to the vehicle and/or to enabling an engine start. The system comprises a vehicle-based memory module comprising a key list containing a multiplicity of entries for a multiplicity of digital keys, which can be allocated to individual users by means of a first (external) electronic apparatus (owner device), wherein each digital key represents a vehicle authorization for a user (e.g. an access authorization and/or an engine-start authorization), and wherein each entry in the key list is assigned a unique identifier, and said system comprises a communication module, which is configured to transfer from the vehicle to the first electronic apparatus at least one unique identifier assigned to an unallocated entry (i.e. an entry that does not yet contain a key for a specific user). The unique identifier is preferably a 2-byte variable.

According to the invention, valid digital keys are stored in the vehicle in a key list having a limited number of entries allowing access and/or an engine start for respective users. Each entry in the key list may exist from the outset and be empty if the entry is not yet being used, or not yet allocated to a user. Each entry in the key list is assigned an identifier ("key slot"), which is unique in the key list, as a variable. In other words, no identifier is assigned to more than one entry or digital key.

Now in order to transfer an authorization to a friend, for instance, the first electronic apparatus (e.g. the owner device) initially receives from the vehicle an identifier representing an "empty" entry in the key list of the vehicle. The first electronic apparatus can pass the "empty" identifier to a second electronic apparatus (e.g. the friend device), which can generate the digital key, for instance by means of asymmetric encryption. The identifier is assigned to the generated digital key. The second electronic apparatus transfers at least part of the generated digital key (e.g. the public key) to the first electronic apparatus, which in turn transfers a data packet to the vehicle. The data packet transferred to the vehicle can contain the digital key (e.g. the public key), the identifier and, optionally, definitions of the authorizations.

"Comfort access" or "passive entry" is thereby provided that allows convenient access to the vehicle, for instance by means of a mobile device. The mobile device, which may be the owner device or the friend device, stores the digital key, for instance after it has generated the digital key for a unique identifier. If the mobile device transfers a data packet containing the digital key to the vehicle, the vehicle can check the integrity of the data packet (e.g. signature, encryption), and insert the key, for instance the public key, together with defined authorizations, in the corresponding entry (or key slot) in the key list. From this time onwards, the authorizations, for instance defined by the owner, can be granted to the mobile device.

In some embodiments, a data packet transferred from the vehicle to the owner device at the outset can contain the unique identifier. In particular, the data packet transferred from the vehicle to the owner device can contain the unique identifier but not the digital key. The present disclosure is not limited thereto, however, and it is possible that the vehicle-based key list contains pre-stored digital keys that can be transferred together with the identifier. Optionally, the data packet can additionally comprise an index of the entry (i.e. a position or row in the key list).

The vehicle and the first electronic apparatus can communicate with each other directly or indirectly. Direct communication means that there are no additional units interposed. Indirect communication means that there is at least one additional unit interposed, for instance a back-end or the friend device. The vehicle and the first electronic apparatus can preferably communicate via Bluetooth or NFC (near-field communication). Similarly, the owner device can transfer a data packet containing the unique identifier to the friend device via Bluetooth, NFC (near-field communication) or the Internet (e.g. by messenger services, email, etc.) for instance.

If the owner device or friend device sends a data packet containing a valid digital key to the vehicle, and the digital key is recognized there, the system grants permission to open the automobile and/or to start the engine. A valid digital key exists in particular when an entry containing the identifier of the received digital key is present in the key list stored in the vehicle. If the identifier of the received digital key is not present, access can, or must, be denied.

The digital key, which can also be referred to as a "virtual key", can be any suitable, essentially forgery-proof key that can be generated digitally and transferred by data transfer between two electronic units, for instance by means of NFC technology. In particular, asymmetric encryption using a secret key and a public key can be employed.

The system can preferably comprise a counter module, which is configured to generate consecutively the identifiers for the entries in the key list, or digital keys. For example, the identifiers can be variables that are increased monotonically by the counter module. In particular it can be guaranteed when creating a new identifier that the new identifier is the highest identifier in the key list in the vehicle. Each identifier is thereby unique in the context of the vehicle and is assigned only once. This can save memory resources, for example, because a limited number of entries in the key list is sufficient for secure access management. For example, the key list stored in the vehicle can contain 100 entries (or digital keys) or less, 50 entries (or digital keys) or less, or even 20 entries (or digital keys) or less.

The counter can preferably be reset, for instance when there is a change of owner of the vehicle. The identifiers can thereby be generated from the beginning again. This can prevent, for example, the counter overflowing after prolonged and/or intensive use.

The present disclosure is not limited to the use of a counter, however, and the unique identifiers can be generated using other suitable means.

The first electronic apparatus (i.e. the owner device) is preferably configured to transfer to the second electronic apparatus (i.e. the friend device) the identifier received from the vehicle. The second electronic apparatus can be configured:
 to generate a digital key, and in particular an asymmetric key pair;
 to assign the identifier received from the first electronic apparatus to the generated digital key; and
 to transfer at least part of the generated digital key to the first electronic apparatus.

For example, the second electronic apparatus can transfer a public key and the associated identifier to the first electronic apparatus. Optionally, definitions of authorizations can be transferred. These can define which authorizations the digital key includes (e.g. only access to the vehicle; access and engine start; etc.).

The first electronic apparatus is preferably configured to generate a data packet that contains at least the digital key generated by the second electronic apparatus, and to transfer the data packet directly or indirectly to the vehicle. The data packet additionally contains the identifier and, optionally, the definitions of the authorizations.

The system is preferably also configured to add the digital key contained in the data packet to the entry in the vehicle-based key list, which entry corresponds to the identifier.

The system is preferably also configured to check an authorization of the first electronic apparatus, for instance of the owner device. In particular, authentication of the owner device can be performed once or multiple times in order to ascertain the authorization of the user. The identifier assigned to the unallocated "empty" entry in the key list can be transferred to the first electronic apparatus only when a positive authorization of the first electronic apparatus exists. For example, the owner device can be authenticated once in order to receive the authorization for key usage and key sharing. In some embodiments, the owner device can be registered for instance in a back-end of a service provider (e.g. of a vehicle manufacturer or car-sharing service provider) in order to receive the authorization for key usage and key sharing. The owner device can thereby act as the key-management master.

The system is preferably configured to replace in the key list stored in the vehicle an existing identifier of a digital key with a new identifier if an input is received to delete an access authorization relating to this digital key. For example, the authorization, or the key, of a user or friend device can be revoked and deleted. The identifier associated with the key is then replaced in the key list by a new identifier, so that the user or the friend device no longer has authorization for access to the vehicle. The entry containing the new identifier can then be allocated again by the owner device. The new identifier can be generated by the counter, for example.

In some embodiments, the input to delete the access authorization can be made by the owner device. For example, the owner device can use Bluetooth or NFC to transfer to the vehicle a data packet that indicates the termination of the access authorization. In further embodiments, the input to delete an access authorization of a user can be made directly in the vehicle, for instance by an input to a control panel of the vehicle.

According to a further independent aspect of the present disclosure, a vehicle is defined comprising the system described in this document. The term vehicle includes cars, trucks, buses, motor homes, motor cycles, etc. which are used to transport people, goods, etc. The term includes in particular motor vehicles for transporting people.

According to a further independent aspect of the present disclosure, an electronic apparatus (e.g. an owner device) is defined comprising a receive module, which is configured to receive the data packet containing the at least one identifier from the system for managing access to a vehicle. The individual identifiers can be stored in a storage medium of the electronic apparatus.

The electronic apparatus (e.g. the first electronic apparatus and/or the second electronic apparatus) is preferably a mobile device. A mobile device is a device that is capable of wireless communication in a mobile network via local area networks (LANs) such as wireless LAN (WiFi/WLAN) or via wide area networks (WANs) such as the Global System for Mobile Communication (GSM), General Packet Radio Service (GPRS), Enhanced Data rate for Global Evolution (EDGE), Universal Mobile Telecommunications System (UMTS), High Speed Downlink/Uplink Packet Access (HSDPA, HSUPA), Long-Term Evolution (LTE), or Worldwide Interoperability for Microwave Access (WiMAX). Communication is possible via other established communication technologies, for instance NFC and UWB (ultra-wideband), or future communication technologies, for instance 5G mobile communication systems. The term mobile device includes in particular smartphones, but also other mobile phones, personal digital assistants (PDAs), tablets, PCs, notebooks, smart watches and all established and future electronic devices that are equipped with technology for downloading and executing apps.

According to a further independent aspect of the present disclosure, a method is defined for managing an authorization for a vehicle. The method comprises providing a vehicle-based key list containing a multiplicity of entries for a multiplicity of digital keys, which can be allocated to individual users by means of a first electronic apparatus, wherein each digital key represents a vehicle authorization for a user, and wherein each entry in the key list is assigned a (single) unique identifier, and said method comprises transferring from the vehicle to the first electronic apparatus at least one unique identifier assigned to an unallocated entry in the key list.

The method can implement the aspects of the system for managing an authorization for a vehicle that are described in this document.

BRIEF DESCRIPTION OF THE DRAWINGS

Exemplary Embodiments of the Disclosure are Described in More Detail Below and Illustrated in the Drawings, in which:

FIG. 3A shows a first exemplary key list according to embodiments of the present disclosure; and FIG. 3B shows a second exemplary key list according to embodiments of the present disclosure.

Detailed Description

The same reference signs are used below for identical and functionally identical elements, unless stated otherwise.

Figure 1:
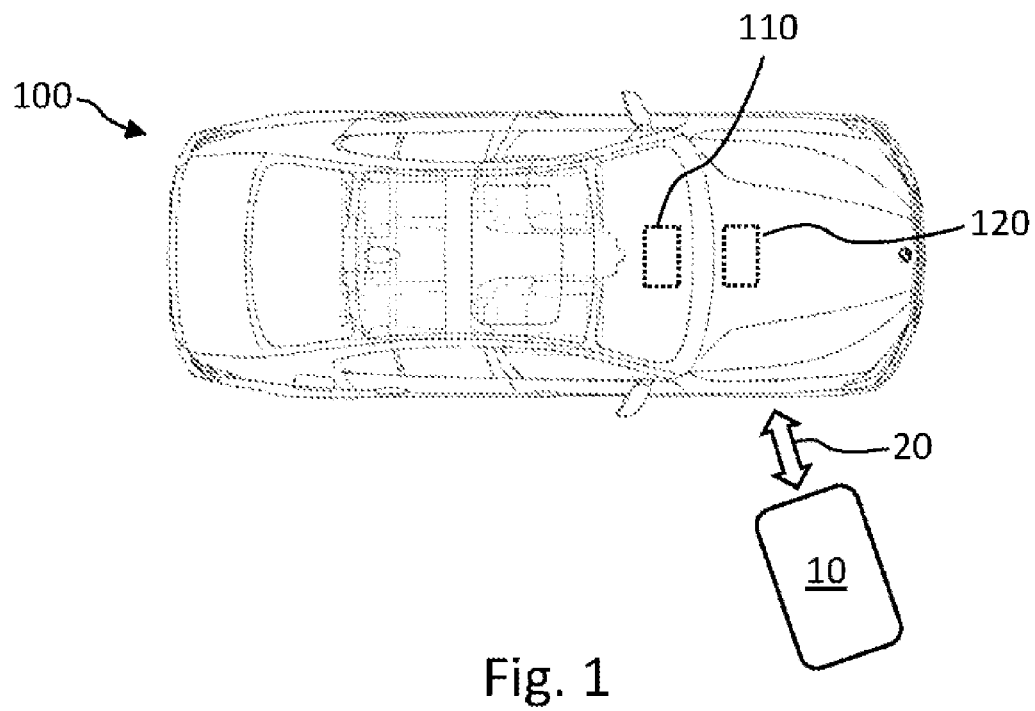
FIG. 1 shows a vehicle and an owner device according to exemplary embodiments of the present disclosure.

FIG. 1 shows a vehicle 100 and an electronic apparatus 10 according to embodiments of the present disclosure.

The system comprises a memory module 110 comprising a key list containing a multiplicity of entries for a multiplicity of digital keys, which can be allocated to individual users by means of a first (external) electronic apparatus 10, wherein each digital key is configured, for example, to allow access to the vehicle and/or an engine start, and wherein each entry or digital key is assigned a unique identifier. The system also comprises a communication module 120, which is configured to transfer to the first electronic apparatus 10 at least one unique identifier assigned to an unallocated entry in the key list.

The memory module 110 and the communication module 120 can be implemented in separate software and/or hardware modules, or can be implemented in a shared software and/or hardware module. In particular, the memory module 110 and the communication module 120 can be implemented in the vehicle 100.

The vehicle 100 can also comprise a control module, which is configured to control, and in particular enable, vehicle functions such as, for instance, a locking mechanism for doors of the vehicle and/or an engine start. The control module can be in communication with the memory module 110 and the communication module 120 in order to execute the functions described in this document, for instance for unlocking the doors of the vehicle. In some embodiments, the memory module 110 and/or the communication module 120 can be integrated in the control module.

For example, the vehicle 100 can comprise a keyless system having a locking system and in particular central locking. Additionally or alternatively, the keyless system can be configured to allow an engine start, for instance by operating a control inside the vehicle 100. If the keyless system establishes a valid authorization on the basis of the transferred data packet containing the digital key and the associated unique identifier, the vehicle 100 can be unlocked by controlling the central locking. In addition, for example, an engine-start button on the dashboard can be enabled so that the driver can start the engine by operating the engine-start button. Additionally or alternatively, an immobilizer can be deactivated.

This is the place to point out the difference between a first case that involves adding a digital key to the key list (in this case the identifier is checked in accordance with the described rules) and a second case for using a digital key. In the second case, for example, a cryptographic check is performed to determine whether the electronic apparatus appears in the key list (e.g. by challenge/response processes based on the secret key and the public key). The identifier can help here to find the correct key more quickly.

The first electronic apparatus 10 may be a mobile device of a vehicle-authorized user. The mobile device of the vehicle-authorized user is referred to as the "owner device" and may be a smartphone, for example. In particular, the vehicle-authorized user may be the vehicle owner, whose mobile device 10 acts as the key-management master.

The first electronic apparatus 10 communicates with the communication module 120 of the vehicle 100 via a communication link 20. The communication link may use, for example, NFC (near-field communication) technology, Bluetooth, etc. The present disclosure is not limited thereto, however, and other direct or indirect communication means that are suitable for data exchange can be used. Direct communication relates here to direct communication between the first electronic apparatus 10 and the vehicle 100. Indirect communication relates here to indirect communication between the first electronic apparatus 10 and the vehicle 100 via at least one interposed unit, for instance a central unit such as a back-end.

By means of the communication connection 20 between the first electronic apparatus 10 and the vehicle 100, "free" identifiers can be transferred by the vehicle from the vehicle 100 to the electronic apparatus 10, and stored in the first electronic apparatus 10 for further use. The first electronic apparatus 10 may receive and store a multiplicity of said "free" indicators. For example, an identifier for a digital key can be provided for personal use, and at least one additional identifier for a digital key can be provided for passing to other electronic apparatuses such as friend devices, for instance.

Figure 2:
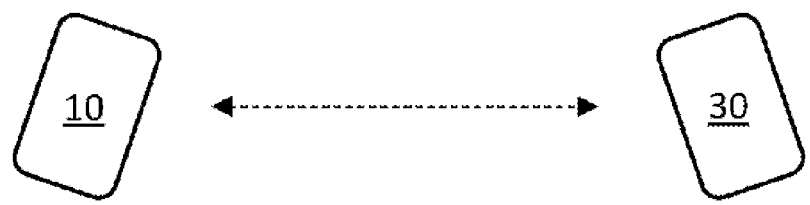
FIG. 2 shows a data transfer between an owner device and a friend device according to exemplary embodiments of the present disclosure.

FIG. 2 shows the transfer of an identifier between an owner device 10 and a friend device 30 according to embodiments of the present disclosure.

The owner device 10 stores one or more unique identifiers, which were received previously from the vehicle. The owner device 10 can communicate with at least one second electronic apparatus (i.e. the friend device 30) via a communication link in order to transfer the unique identifier to the friend device 30.

The second electronic apparatus 30 can generate a digital key (e.g. secret key and public key) in order to facilitate asymmetric encryption. The identifier is assigned to the generated digital key. The second electronic apparatus 30 can transfer at least part of the generated digital key (e.g. the public key) to the first electronic apparatus 10 via the communication link.

The first electronic apparatus 10 can generate and transfer to the vehicle a data packet. The data packet can contain the received digital key (e.g. the public key), the identifier and, optionally, definitions of the authorizations.

The vehicle can check the integrity of the received data packet (e.g. signature, encryption), and insert the key, for instance the public key, together with defined authorizations, in the corresponding entry (or key slot) in the key list. The friend device 30 thus receives a valid key, by means of which the user of the friend device 30 receives authorization to use the vehicle.

In some embodiments, the transferred identifier can be labeled in the owner device 10 as allocated. Alternatively, the transferred identifier can be deleted in the owner device 10. This can prevent an identifier from being allocated more than once.

The owner device 10 communicates with the friend device 30 via a communication link. The communication link can facilitate the use of messenger services or apps. The communication link may use, for example, NFC (near-field communication) technology, Bluetooth, etc. The present disclosure is not limited thereto, however, and other direct or indirect communication means that are suitable for data exchange can be used. Direct communication relates here to direct communication between the owner device 10 and the friend device 30. Indirect communication relates here to indirect communication between the owner device 10 and the friend device 30 via at least one interposed unit, for instance a central unit such as a back-end.

FIGS. 3A and 3B show key lists according to embodiments of the present disclosure. The key list is stored in a typical manner in a secure memory module, which is integrated in the vehicle.

The key list comprises a limited number of entries. Each entry can consist of a static designation (e.g. 1, 2, 3 . . . ), the dynamic identifier ("key slot") and the digital key, which may be empty initially.

In the example of FIGS. 3A and B, the entries are indexed by the index n. The key list can contain, for example, 100 entries (or digital keys) or less, 50 entries (or digital keys) or less, or even 20 entries (or digital keys) or less. Each entry or each digital key is assigned a unique identifier. The unique identifier may be a 2-byte variable, for example.

The vehicle can transfer a data packet containing one or more "free", or unallocated, identifiers to the owner device of the vehicle owner. If a digital key associated with the identifier is then sent by the owner device or a friend device to the vehicle 100 and is recognized there, the system grants permission to open the automobile and/or to start the engine. A valid digital key exists when an entry containing the identifier of the received digital key is present in the key list stored in the vehicle. If the identifier of the received digital key is not present, access can, or must, be denied.

The identifier is used in particular to find the correct key in the key list. The secure authentication can then take place on the basis of another datum. For example, the public key is stored in the key list and used to verify by challenge/response techniques the private key of the device, whereby authorization can take place.

Deleting an authorization is now explained with reference to FIGS. 3A and B. The authorization of a user or friend device can be revoked, for instance, by an input to delete the authorization. The input can be made, for example, by the vehicle-authorized user of the owner device.

In some embodiments, the input to delete the authorization can be made by the owner device. For example, the owner device can transfer to the vehicle by means of Bluetooth, NFC or indirectly via a vehicle back-end a data packet that indicates the termination of the authorization. In further embodiments, the input to delete an authorization of a user can be made directly in the vehicle, for instance by an input to a control panel of the vehicle.

In yet further embodiments, a key can also be deleted by a back-end. This can be initiated automatically, for instance after an authorization has expired. In a further example, the deletion can be initiated by a user input to any user interface.

If the input to delete an authorization relating to this digital key is received at the vehicle, an existing identifier of an entry can be replaced by a new identifier in the key list stored in the vehicle, so that the user or the friend device no longer has authorization for access to the vehicle. Then the new identifier can again be transferred to the owner device and allocated by the owner device.

This is shown in FIGS. 3A and B for the index entry 1. In FIG. 3A, the entry "1" contains a digital key and an identifier 1, which are assigned to a specific user or friend device. The entry "2" is not allocated to a user and is therefore "empty". The entry "n" is likewise allocated to a user.

If then the authorization defined in the entry "1" is revoked, the "identifier 1" of the authorization to be deleted is replaced by a new identifier "identifier n+1", and, optionally, the associated digital key is deleted. The (new) identifiers can be generated consecutively by a counter module, for instance. For example, the identifiers can be variables that are increased monotonically by the counter module. In particular, it can be guaranteed when creating a new identifier that the new identifier is the highest identifier in the key list in the vehicle. Each identifier is thereby unique in the context of the vehicle and is assigned only once. This can save memory resources, for example, because a limited number of entries in the key list is sufficient for secure access management.

The problems associated with key management, and measures according to the invention for solving the problems, are summarized below.

The vehicle holds what is known as a key list. For reasons of memory, the key list offers a limited number of entries. Each entry in the key list corresponds to an authorization for a device. Authorizations may be different (e.g. vehicle access, engine start, entertainment system, etc.). An entry in the key list may also be empty in an initial state.

Each entry in the key list comprises a static index (entry 1, entry 2, . . . ), a datum allowing unique authentication of the device (public key, symmetric key, etc.) and a definition of the authorizations that are meant to apply to this device. A new authorization for a device can be adopted in the key list in various ways.

One possible way is what is known as key sharing. In this case, the owner of the vehicle uses the owner device to pass an authorization to another device. The new device is referred to as a friend device. In one example, this process proceeds as follows:

a) The Owner Device Sends an Invitation to the Friend Device;

b) The friend device sends a unique datum for authentication to the owner device. For example, asymmetric cryptography can be used for the authentication. In this case, the unique datum (which is transferred at this point) corresponds to the public key of the device, whose corresponding secret key is known solely to the friend device.

c) The owner device creates an authorization packet for the new authorization. This contains at least the datum for authentication of the friend device and the authorizations to be granted to the friend device.
d) The owner device provides the authorization packet with protective measures against forgery or tampering (e.g. a signature).
e) The authorization packet is transferred to the vehicle. The communication path can run indirectly, via the friend device, via the back-end connection to the vehicle, etc.
f) The vehicle verifies the protective measures from d). The new authorization is added to the key list. The granted authorizations are available to the friend device from now onwards.
g) An authorization can be revoked again at any time (even as early as after c)). The source of this revocation may be the owner device, a back-end system or the vehicle itself. In conventional systems, however, it sometimes cannot be ensured that the adding and revoking of (a plurality of) keys are received and implemented in the correct order at the vehicle (synchronization errors, connection errors, etc.).

A potential problem is that a valid authorization packet continues to exist for an authorization which has already been revoked. This authorization packet can be presented to the vehicle, resulting in the authorization being added to the key list again. This is not the intention of the revoker of the authorization, and constitutes a security risk (replay attacks).

A possible measure derived therefrom is that each revoked authorization remains in the key list. Its status is changed to revoked. An authorization packet that can be assigned to an entry having the revoked status thus loses its validity. This corresponds to the concept of a revocation list.

The limited memory space, however, allows only a limited number of possible entries in the key list. This in turn restricts the possible number of actions (adding and revoking) that can be performed.

Instead of the aforementioned measures, a counter can now be introduced for the key list. This is incremented with every revocation. The counter is synchronized with all instances that can issue authorizations (owner device). The current counter value is written into every new authorization packet. An authorization packet is invalid once it contains a lower counter value than the value currently valid in the vehicle. Hence an entry in the key list can be reused after a revocation.

A potential problem is that if a revocation is issued by a source other than the owner device, synchronization of the counter cannot be guaranteed (e.g. the vehicle has no network connection). The owner device thus unknowingly issues invalid authorization packets. In addition, authorization packets issued at an earlier time that have not yet been presented to the vehicle become invalid.

A measure derived therefrom is to assign a random, unique identifier to each entry in the key list. If an entry does not contain a valid authorization, i.e. is free, the associated identifier is designated as free. The vehicle transmits to the owner device any number of free identifiers. This can take place at any time (for instance while the owner device is being used as the vehicle key). By increasing the number, the probability can be increased that the owner device will always have sufficient free indicators available. When a new authorization is issued, one of the free identifiers is written into the authorization packet. If the vehicle receives an authorization packet containing a free indicator, it inserts the authorization into the associated entry in the key list.

A revocation sets the status of the entry to free. The datum for authentication is retained until the entry is overwritten. A new authorization packet can overwrite an entry of the associated identifier only if it does not contain the same datum for authentication.

In this case, although the previous authorization packet for an identifier invalid can be made invalid by a revocation, even older authorization packets for the same identifier may not be recognized as invalid.

In order to avoid this, a rationale for generating and checking a unique identifier is used, as defined in the present invention.

Each identifier is represented by a number, for example. Each newly generated identifier is a number that is higher than all the other existing identifiers in the key list (at least n+1). In the event of a revocation, the identifier of the entry in the key list is deleted and generated anew. Thus in the event of a revocation, the identifier belonging to the entry is always increased. When checking an authorization packet, as explained above, it is only necessary to ascertain that the identifier supplied therewith is present in the key list. A previously allocated and revoked identifier is thus no longer (or never again) valid.

It is theoretically possible to dispense with the incrementing of the identifier provided it is ensured that each identifier appears exactly once in the life cycle of the system, i.e. is unique.

The invention claimed is:

1. A system for managing an authorization for a vehicle, comprising:
   a vehicle-based memory of the vehicle comprising a key list containing a multiplicity of entries for a multiplicity of digital keys, wherein each of the digital keys can be allocated to individual users via a first electronic apparatus of a first party who currently has authorization to use the vehicle, wherein each digital key represents a vehicle authorization for a user associated with the first party, and wherein each entry in the key list is assigned a unique identifier;
   a communication module of the vehicle configured to transfer, from the vehicle to the first electronic apparatus of the first party, at least one identifier assigned to an unallocated entry in the key list
   a second electronic apparatus configured to:
      receive the at least one unique identifier assigned to the unallocated entry in the key list transferred from the first electronic apparatus;
      generate a digital key, and in particular an asymmetric key pair;
      assign the at least one unique identifier transferred from the first electronic apparatus of the first party to the generated digital key; and
      transfer at least part of the generated digital key to the first electronic apparatus of the first party, wherein the second electronic apparatus belongs to a second party associated with the first party;
   wherein the first electronic apparatus is configured to:
      generate a data packet containing (1) the at least one unique identifier assigned to the unallocated entry in the key list, (2) the at least part of the generated digital key received from the second electronic apparatus, and (3) authorization associated with the second electronic apparatus;
      transfer the data packet to the vehicle to allow the vehicle to associate the at least one unique identifier to an allocated entry in the key list; and a keyless system controller of the vehicle in communication with the communication module, the keyless system controller configured to control a vehicle lock or an engine start system upon receipt by the communication module of a valid digital key associated with the unique identifier assigned to one of the multiplicity of entries in the key list.

2. The system as claimed in claim 1, wherein the unique identifier assigned to each of the multiplicity of entries in the key list is a 2-byte variable.

3. The system as claimed in claim 2, further comprising a counter configured to generate consecutively unique identifiers assigned to the multiplicity of entries in the key list.

4. The system as claimed in claim 1, further comprising a counter configured to generate consecutively unique identifiers assigned to the multiplicity of entries in the key list.

5. The system as claimed in claim 1, wherein the system is configured to replace an existing identifier of an entry in the key list with a new identifier if an input is received to delete a vehicle authorization of a user that is assigned to this entry.

6. The system as claimed in claim 5, further comprising a counter configured to generate consecutively unique identifiers assigned to the multiplicity of entries in the key list.

7. The system as claimed in claim 1, wherein the system is configured to replace an existing identifier of an entry in the key list with a new identifier if an input is received to delete a vehicle authorization of a user that is assigned to this entry.

8. The system as claimed in claim 1, wherein the first electronic apparatus is configured to transfer the data packet directly or indirectly to the vehicle.

9. The system as claimed in claim 8, wherein the unique identifier assigned to each of the multiplicity of entries in the key list is a 2-byte variable.

10. The system as claimed in claim 8, wherein the system is also configured to add the digital key contained in the data packet to the unallocated entry in the key list, which unallocated entry corresponds to the at least one identifier transferred from the vehicle.

11. The system as claimed in claim 10, wherein the unique identifier assigned to each of the multiplicity of entries in the key list is a 2-byte variable.

12. The system as claimed in claim 8, wherein the system is further configured to replace an existing identifier of an entry in the key list with a new identifier if an input is received to delete a vehicle authorization of a user that is assigned to this entry.

13. A method for managing an authorization for a vehicle, comprising:
providing a vehicle-based key list containing a multiplicity of entries for a multiplicity of digital keys, wherein each of the digital keys can be allocated to individual users by means of a first electronic apparatus of a first party who currently has authorization to use the vehicle, wherein each digital key represents a vehicle authorization for a user associated with the first party, and wherein each entry in the key list is assigned a unique identifier;
transferring from the vehicle to the first electronic apparatus of the first party at least one unique identifier assigned to an unallocated entry in the key list;
receiving at a second electronic apparatus the at least one unique identifier assigned to the unallocated entry in the key list from the first electronic apparatus, wherein the second electronic apparatus belongs to a second party associated with the first party;
generating a digital key, and in particular an asymmetric key pair, at the second electronic apparatus;
assigning the at least one unique identifier transferred from the first electronic apparatus of the first party to the generated digital key;
transferring from the second electronic apparatus at least part of the generated digital key to the first electronic apparatus of the first party;
generating a data packet containing (1) the at least one unique identifier assigned to the unallocated entry in the key list, (2) the at least part of the generated digital key, and (3) authorization associated with the second electronic apparatus;
transferring the data packet to the vehicle to allow the vehicle to associate the at least one unique identifier to an allocated entry in the key list, the data packet containing at least part of the generated digital key and the unique identifier assigned to an entry in the key list; and
controlling a keyless system of the vehicle upon receipt at the vehicle of a valid digital key associated with the unique identifier assigned to one of the multiplicity of entries in the vehicle-based key list.

14. The method of claim 13 wherein the controlling the keyless system of the vehicle comprises controlling a vehicle lock or enabling an engine start button.

15. The method of claim 13 further comprising generating consecutively unique identifiers assigned to the multiplicity of entries in the key list.

16. A vehicle configured for communication with a first electronic apparatus of a first party who currently has authorization to use the vehicle and a second electronic apparatus belonging to a second party associated with the first party, the vehicle comprising:
a memory comprising a key list containing a multiplicity of entries for a multiplicity of digital keys, wherein each of the digital keys can be allocated to individual users via the first electronic apparatus, wherein each digital key represents a vehicle authorization for a user associated with the first party, and wherein each entry in the key list is assigned a unique identifier;
a transceiver configured to wirelessly transfer from the vehicle to the first electronic apparatus of the first party at least one identifier assigned to an unallocated entry in the key list,
wherein the second electronic apparatus is configured to:
receive the at least one unique identifier assigned to the unallocated entry in the key list transferred from the first electronic apparatus:
generate a digital key, and in particular an asymmetric key pair;
assign the at least one unique identifier transferred from the first electronic apparatus of the first party to the generated digital key; and
transfer at least part of the generated digital key to the first electronic apparatus of the first party;
wherein the first electronic apparatus is configured to:
generate a data packet containing (1) the at least one unique identifier assigned to the unallocated entry in the key list, (2) the at least part of the generated digital key received from the second electronic apparatus and (3) authorization associated with the second electronic apparatus; and
transfer the data packet to the vehicle to allow the vehicle to associate the at least one unique identifier to an allocated entry in the key list; and a keyless system controller configured to control a vehicle lock or an engine start system upon receipt at the transceiver of a valid digital key from the second electronic apparatus, wherein the valid digital key is associated with the unique identifier assigned to one of the multiplicity of entries in the key list.

17. The vehicle of claim 16 further comprising a counter configured to generate consecutively unique identifiers assigned to the multiplicity of entries in the key list, wherein the transceiver is configured to wirelessly receive the valid digital key from the second electronic apparatus, and wherein the first electronic apparatus is a first smartphone associated with an owner of the vehicle and the second electronic apparatus is a second smartphone associated with a non-owner of the vehicle.

18. The vehicle of claim 16 wherein the vehicle is configured to replace an existing identifier of an entry in the key list with a new identifier if an input is received to delete a vehicle authorization of a user that is assigned to this entry.

19. The vehicle of claim 16 wherein the first electronic apparatus is configured to transfer the data packet directly or indirectly to the vehicle.

20. The vehicle of claim 19 wherein the vehicle is configured to add the digital key contained in the data packet to the unallocated entry in the key list, which unallocated entry corresponds to the at least one identifier transferred from the vehicle.

* * * * *